United States Patent [19]

August et al.

[11] 4,242,486

[45] Dec. 30, 1980

[54] PROCESS FOR PREPARING ORGANOPOLYSILOXANE RESINS CONTAINING SI-BONDED VINYL GROUPS

[75] Inventors: Peter August, Seevetal; Willi Primas, Simbach, both of Fed. Rep. of Germany

[73] Assignee: Wacker-Chemie GmbH, Munich, Fed. Rep. of Germany

[21] Appl. No.: 39,014

[22] Filed: May 14, 1979

[30] Foreign Application Priority Data

May 26, 1978 [DE] Fed. Rep. of Germany ....... 2823118

[51] Int. Cl.³ .............................................. C08G 77/06
[52] U.S. Cl. ...................................... 528/14; 528/15; 528/16; 528/18; 528/32; 528/33; 528/35; 528/37; 528/43
[58] Field of Search ..................... 528/14, 15, 16, 18, 528/32, 33, 35, 37, 43

[56] References Cited

U.S. PATENT DOCUMENTS

| | | | |
|---|---|---|---|
| 3,294,737 | 12/1966 | Krantz | 528/43 |
| 3,375,223 | 3/1968 | Merrill | 528/16 |
| 3,546,156 | 12/1970 | Baronnier et al. | 528/32 |

*Primary Examiner*—Melvyn I. Marquis

[57] ABSTRACT

A process for preparing organopolysiloxane resins containing Si-bonded vinyl groups which comprises heating to a temperature of from about 85° to 95° C. a mixture containing (A) an organopolysiloxane having at least 0.1 percent by weight of Si-bonded hydroxyl groups and at least 50 mol percent of monoorganosiloxane units ($RSiO_{3/2}$), (B) an organosiloxane containing from 2 to 10 silicon atoms per molecule, in which substantially all the silicon valences which are not satisfied by siloxane oxygen atoms, are satisfied by SiC-bonded hydrocarbon radicals, and having on the average at least two such hydrocarbon radicals for each silicon atom and at least one of the siloxanes (A) and/or (B) has an average of at least one SiC-bonded vinyl group, and (C) an acid activated bleaching clay; wherein the water released during the heating step by the condensation of Si-bonded hydroxyl groups is retained in the reactive mixture.

4 Claims, No Drawings

PROCESS FOR PREPARING ORGANOPOLYSILOXANE RESINS CONTAINING SI-BONDED VINYL GROUPS

The present invention relates to organopolysiloxane resins and more particularly to a process for preparing organopolysiloxane resins containing Si-bonded vinyl groups which comprises heating an organopolysiloxane containing Si-bonded hydroxyl groups with an organosiloxane in the presence of an acid activated clay, in which at least one of the siloxanes has an average of at least one Si-bonded vinyl group.

BACKGROUND OF INVENTION

Organopolysiloxane resins containing vinyl groups are described in U.S. Pat. No. 3,546,156 to Baronnier et al. These resins are prepared by hydrolyzing phenyltrichlorosilane, trimethylchlorosilane, diphenyldichlorosilane, methylvinyldichlorosilane and dimethyldichlorosilane in the presence of water and thereafter condensing the resultant product in the presence of a diluent and a catalyst while removing the water as it forms. In the process described in this reference, mixtures of silanes having varying ratios of organic to hydrolyzable groups are hydrolyzed and condensed at temperatures above 110° C. to remove the water of condensation in order to form storage stable organopolysiloxane resins, that are substantially free of Si-bonded hydroxyl groups. Compared to the process described in the above patent, the process of this invention has the advantage that the organopolysiloxane resins do not contain at least 25 mol percent of diphenylsiloxane units in order to be flowable. Moreover, the process of this invention, does not require that a mixture of silanes having varying ratios of organic to hydrolyzable groups be used in order to prepare the organopolysiloxane resins of this invention. Furthermore, the organopolysiloxane resins prepared in accordance with the process of this invention are substantially free of Si-bonded hydroxyl groups and may be molded without forming voids. Thus, it is apparent that the process of this invention provides a more direct and improved method for preparing organopolysiloxane resins containing vinyl groups.

Therefore it is an object of this invention to provide a process for preparing organopolysiloxane resins. Another object of this invention is to provide a process for preparing organopolysiloxane resins containing vinyl groups. Still another object of this invention is to provide a method for preparing vinyl containing organopolysiloxane resins which are substantially free of Si-bonded hydroxyl groups. A further object of this invention is to provide a process for preparing vinyl containing organopolysiloxane resins from a mixture containing an organopolysiloxane having Si-bonded hydroxyl groups and an organosiloxane in which at least one of the siloxanes has an average of at least one Si-bonded vinyl group.

SUMMARY OF INVENTION

The foregoing objects and others which will become apparent from the following description are accomplished in accordance with the invention, generally speaking, by providing a process for preparing organopolysiloxane resins containing Si-bonded vinyl groups which comprises heating to a temperature of from about 85° to 95° C. a mixture containing (A) an organopolysiloxane having at least 0.1 percent by weight of Si-bonded hydroxyl groups and at least 50 mol percent of monoorganosiloxane units, (B) an organosiloxane having from 2 to 10 silicon atoms per molecule, in which substantially all the silicon valences which are not satisfied by silicon oxygen atoms, are satisfied by SiC-bonded hydrocarbon radicals, and at least two such hydrocarbon radicals are present for each silicon atom and at least one of the siloxanes (A) and/or (B) has an average of at least one SiC-bonded vinyl group, and (C) an acid activated bleaching clay; wherein the water released during the heating step by the condensation of Si-bonded hydroxyl groups is retained in the reactive mixture and thereafter separating the organopolysiloxane resins from the bleaching clay.

DETAILED DESCRIPTION OF INVENTION

The organopolysiloxanes (A) may contain in addition to the monoorganosiloxane units (RSiO$_{3/2}$) up to 50 mol percent of diorganosiloxane units (R$_2$SiO) and up to 10 mol percent triorganosiloxane units (R$_3$SiO$_{1/2}$) and/or SiO$_{4/2}$ units. In addition to the monoorganosiloxane units and possibly at least one of the above cited siloxane units, the organopolysiloxanes (A) used in the process of this invention, may for example also contain O$_{3/2}$ SiCH$_2$CH$_2$SiO$_{3/2}$ units.

Examples of SiC-bonded hydrocarbon radicals represented by R above in the organopolysiloxanes (A) are alkyl radicals, such as the methyl, ethyl, n-propyl and the isopropyl radicals; alkenyl radicals such as the vinyl radical; and aryl radicals such as the phenyl radical. Because of their availability, it is preferred that at least 80 percent of the number of SiC-bonded hydrocarbon radicals in the organopolysiloxanes (A) be methyl radicals and that no more than about 5 percent of the SiC-bonded hydrocarbon radicals in the organopolysiloxanes (A) be phenyl radicals. Furthermore it is preferred that all of the SiC-bonded hydrocarbon radicals in the organopolysiloxanes (A) be free of aliphatic multiple bonds.

The organopolysiloxanes (A) can for example be prepared by hydrolyzing at least one organosilane of the following formula:

RSiX$_3$, where X represents the same or different hydrolyzable groups, for example an ethoxy group, or the same or different hydrolyzable atoms, such as chlorine; and R is the same as above. Preferably the organosilane may be mixed with up to 50 mol percent based on the total molar quantity of the silane mixture used, of at least one organosilane of the following general formula:

R$_2$SiX$_2$, where R and X are the same as above; however, R and X need not be identical to R and X above. Moreover, up to 10 mol percent of the total molar quantity of the silane mixture used, may contain at least one organosilane of the following general formula:

R$_3$SiX, where R and X are the same as above, but need be identical to R and X above and/or at least one silane of the general formula:

SiX$_4$, where X represents the same groups as above and at least one silcarban of the formula:

$$X_3SiCH_2CH_2SiX_3,$$

where X is the same as above.

The organopolysiloxanes (A) may consist of one or a mixture of various types of organopolysiloxanes. It is preferred that organopolysiloxanes (A) contain at least 0.2 percent by weight of Si-bonded hydroxyl groups.

The organosiloxanes (B) having from 2 to 10 silicon atoms per molecule in which substantially all silicon valences which are not satisfied by siloxane oxygen atoms, are satisfied by SiC-bonded hydrocarbon radicals and an average of at least two such hydrocarbon radicals are present for each Si-atom, may be linear, cyclic or branched. The previously mentioned examples of SiC-bonded hydrocarbon radicals in organopolysiloxanes (A) are equally applicable to the hydrocarbon radicals in organosiloxanes (B). Nevertheless it is preferred that at least 30 percent of the molecules in organosiloxanes (B) have at least two vinyl groups. Representative examples of such organosiloxanes are those having the formulas:

$$CH_2=CH(CH_3)_2SiOSi(CH_3)_2CH=CH_2,$$

$$(CH_2=CH)_2CH_3SiOSiCH_3(CH=CH_2)_2,$$

$$[CH_2=CH(CH_3)SiO]_3,$$

$$[CH_2=CH(CH_3)SiO]_4,$$

$$Si[OSi(CH_3)_2CH=CH_2]_4,$$

$$CH_3Si[OSi(CH_3)_2CH=CH_2]_3,$$

$$CH_2=CH(CH_3)_2SiO[Si(CH_3)CH=CH_2O]_n\text{-}Si(CH_3)_2CH=CH_2,$$

where n is an integer having a value of from 1 to 10.

Although various types of organosiloxanes (B) having vinyl groups may be employed, the preferred vinyl containing organosiloxane (B) is 1,3-divinyl-1,1,3,3-tetramethyldisiloxane.

It is preferred that organosiloxanes (B) be used in an amount of from 2 to 100 percent by weight and more preferably from 5 to 50 percent by weight, based on the weight of organopolysiloxanes (A), providing that the triorganosiloxane units are not greater than 15 mol percent of the total number of siloxane units present in siloxanes (A) and (B). The greater the amount of organosiloxanes (B) and the greater the proportion of triorganosiloxane units in organosiloxanes (B), the lower the viscosity of the organopolysiloxane resins thus obtained (for example 50 to 2,500 mPa at 25° C.).

An acid activated bleaching clay (C) which is commercially available, preferably has the following properties:

| | |
|---|---|
| Bulk weight: | 450 g/liter |
| Loose weight: (apparent density) | 670 g/liter |
| Specific weight: | 2.4 kg/liter |
| Humidity content (2 hrs. at 110° C.): | Max. 7% by weight |
| Red heat loss (1000° C.): | Max. 7% by weight |
| pH in 10 wt. % aqueous suspension: | 2.9 |

The bleaching clay consists of silicon dioxide, aluminum oxide, ferric oxide, magnesium oxide, sodium oxide, and potassium oxide and about 97 percent by weight of the bleaching clay can be passed through a 150 micron mesh sieve.

Several other acid activated bleaching clays are available under such registered trademarks as "Terrana L80", "Tonsil AC", "Clarit Standard A", "Nordal", "Filtrol ultra" and "Rumsil". These are equally suited for use in the process of this invention.

Even though only one type of acid activated bleaching clay may be employed, various kinds of acid activated bleaching clays may be used in the process of this invention.

The acid activated bleaching clay (C) is preferably used in an amount of from 1 to 5 percent by weight, based on the total weight of organosiloxanes (A) and (B).

It is preferred that the heating process be carried out at atmospheric pressure, i.e., at 1 bar or at approximately 1 bar. Nevertheless, higher pressures may be used as well.

Generally the heating period required in the process of this invention ranges from about 0.5 to about 2 hours.

If the viscosity of the organopolysiloxane resin formed as a result of the process of this invention does not exceed about 3000 mPa at 25° C., it is preferably separated from the bleaching clay be filtration with, for example, the aid of a filter press. However, if the organopolysiloxane resin has a viscosity in excess of 3000 mPa at 25° C. or if it is solid at room temperature, then it can be dissolved in a solvent such as toluene and/or trichloroethylene and then filtered and the solvent subsequently removed by distillation.

The organopolysiloxane resins having SiC-bonded vinyl groups prepared in accordance with this invention may be used for example to insulate and encapsulate electrical components, to form molded objects such as dental impression spoons, and to prepare coatings.

Organopolysiloxane resins prepared in accordance with this invention may for example be hardened with the aid of peroxide compounds or by adding an organopolysiloxane having Si-bonded hydrogen and a catalyst which promotes the addition of Si-bonded hydrogen to an aliphatic multiple bond, for example a product obtained from the reaction of $H_2PtCl_6.6H_2O$ and cyclohexanone.

In the following examples, all percentages are by weight unless otherwise specified.

EXAMPLE 1

About 600 g of an organopolysiloxane consisting of 80 mol percent of monomethylsiloxane units ($CH_3SiO_{3/2}$) and 20 mol percent of dimethylsiloxane units having a viscosity of 61,000 mPa at 25° C. and 0.78 percent of Si-bonded hydroxyl groups as organopolysiloxane (A) are mixed with 69 g of 1,3-divinyl-1,1,3,3-tetramethyldisiloxane as organosiloxane (B) and heated to 90° C. in a 3-necked flask which is equipped with a mechanical stirrer, a thermometer connected to a thermostat and a reflux condenser. After the temperature has achieved a steady level of 90±2° C., 17 g (approx. 2 percent based on the weight of both organosiloxanes) of acid activated bleaching clay having the previously indicated properties are added. The mixture obtained is then stirred for one hour at 90±2° C., then diluted with toluene in a volumetric ratio of 1:1, filtered and then placed in a rotating evaporator in which the volatile components are removed at a bath temperature of 120°

C., first at 12 mm Hg (abs.) and then for one hour in an oil pump vacuum.

EXAMPLE 2

The procedure described in Example 1 is repeated, except that 75 g of 1,3-divinyl-1,1,3,3-tetramethyldisiloxane, and 60 g of hexamethyldisiloxane are used as organosiloxane (B). The resultant mixture is filtered while still hot due to the relatively low viscosity of the organopolysiloxane. Since the mixture was not diluted prior to filtration, the product need not be distilled to remove any volatile components.

EXAMPLE 3

The procedure described in Example 1 is repeated, except that 480 g of an organopolysiloxane consisting of 80 mol percent of monomethylsiloxane units and 20 mol percent of dimethylsiloxane units having a viscosity of 61,000 mPa at 25° C., and 0.78 percent of Si-bonded hydroxyl groups as organopolysiloxane (A), and 120 g of an organopolysiloxane consisting of 50 mol percent of monomethylsiloxane units and 50 mol percent of dimethylsiloxane units having a viscosity of 1590 mPa at 25° C. and 0.49 percent of Si-bonded hydroxyl groups, are used. The resultant mixture is filtered without any prior dilution while still hot due to the relatively low viscosity of the organopolysiloxane.

EXAMPLE 4

The procedure described in Example 1 is repeated, except that 360 g of organopolysiloxane consisting of 80 mol percent monomethylsiloxane units and 20 mol percent of dimethylsiloxane units and having a viscosity of 61,000 mPa at 25° C. and 0.78 percent Si-bonded hydroxyl groups, and 240 g of the organopolysiloxane containing 50 mol percent of monomethylsiloxane units and 50 mol percent of dimethylsiloxane units having a viscosity of 1590 mPa at 25° C. and 0.49 percent of Si-bonded hydroxyl groups are used. The organopolysiloxane obtained is filtered in accordance with the procedure described in Example 2 without any prior dilution.

EXAMPLE 5

The procedure described in Example 1 is repeated, except that 82 g of 1,3-divinyl-1,1,3,3-tetramethyldisiloxane are used.

EXAMPLE 6

The procedure described in Example 1 is repeated, except that 103 g of 1,3-divinyl-1,1,3,3-tetramethyldisiloxane are used.

All of the organopolysiloxane resins having Si-bonded vinyl groups which have been prepared in accordance with Examples 1 through 6, contain less than 0.1 percent of Si-bonded hydroxyl groups. The following Table shows the viscosities of these resins:

TABLE

| Example | Viscosity mPa |
|---------|---------------|
| 1 | 44000 |
| 2 | 2700 |
| 3 | 2500 |
| 4 | 910 |
| 5 | 8400 |
| 6 | 3600 |

What is claimed is:

1. A process for preparing organopolysiloxane resins containing Si-bonded vinyl groups which comprises heating to a temperature of from about 85° to 95° C., a mixture containing (A) an organopolysiloxane having at least 0.1 percent by weight of Si-bonded hydroxyl groups and containing units selected from the group consisting of $RSiO_{3/2}$, $R_2SiO$, $R_3SiO_{1/2}$, $SiO_{4/2}$ and $O_{3/2}Si\,CH_2CH_2\,SiO_{3/2}$ units, in which at least 50 mol percent of the units of the organopolysiloxane are monoorganosiloxane units of the formula $RSiO_{3/2}$, in which R represents SiC-bonded hydrocarbon radicals, (B) an organosiloxane having from 2 to 10 silicon atoms per molecule, in which substantially all the silicon valences which are not satisfied by silicon oxygen atoms, are satisfied by SiC-bonded hydrocarbon radicals, and at least two such hydrocarbon radicals are present for each silicon atom with at least one of the siloxanes (A) and (B) having an average of at least one Si-bonded vinyl group and (C) an acid activated bleaching clay, wherein water released during the heating step by the condensation of Si-bonded hydroxyl groups is retained in the reactive mixture, and thereafter separating the organopolysiloxane resins from the bleaching clay.

2. The process of claim 1, wherein organopolysiloxane (A) is free of aliphatic multiple bonds and at least two vinyl groups per molecule are present on at least 30 percent of the molecules of the organosiloxane (B).

3. The process of claims 1 or 2, wherein the organosiloxane (B) is 1,3-divinyl-1,1,3,3-tetramethyldisiloxane.

4. The process of claims 1 or 2, wherein the acid activated bleaching clay is used in an amount of from 1 to 5 percent by weight, based on the total weight of siloxanes (A) and (B).

* * * * *